US012752801B2

(12) United States Patent
Kim

(10) Patent No.: US 12,752,801 B2
(45) Date of Patent: Oct. 6, 2026

(54) APPARATUS AND METHOD FOR CONTROLLING REDUNDANT STEERING SYSTEM

(71) Applicant: HYUNDAI MOBIS CO., LTD., Seoul (KR)

(72) Inventor: Tae Hong Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 514 days.

(21) Appl. No.: 18/223,642

(22) Filed: Jul. 19, 2023

(65) Prior Publication Data

US 2024/0140447 A1 May 2, 2024

(30) Foreign Application Priority Data

Nov. 2, 2022 (KR) ........................ 10-2022-0144538

(51) Int. Cl.
*B60W 50/023* (2012.01)
*B60W 50/00* (2006.01)
*B62D 5/04* (2006.01)

(52) U.S. Cl.
CPC ........... *B60W 50/023* (2013.01); *B62D 5/046* (2013.01); *B60W 2050/0056* (2013.01); *B60W 2710/205* (2013.01); *B60W 2710/207* (2013.01)

(58) Field of Classification Search
CPC ....... B60W 50/023; B60W 2050/0056; B60W 2710/205; B60W 2710/207; B62D 5/046; B62D 5/001; B62D 5/003; B62D 5/0484; B62D 5/0463; B60R 16/023; H04L 43/0823; B60T 2270/402; B60T 2270/413; B60Y 2306/13; B60Y 2306/15
See application file for complete search history.

(56) References Cited

U.S. PATENT DOCUMENTS

2021/0094611 A1* 4/2021 Kim .................... B62D 5/0493

FOREIGN PATENT DOCUMENTS

KR 10-2017-0136765 A 12/2017

* cited by examiner

*Primary Examiner* — Long T Tran
*Assistant Examiner* — Charles J Brauch
(74) *Attorney, Agent, or Firm* — Morgan, Lewis & Bockius LLP

(57) ABSTRACT

Disclosed herein are an apparatus and a method for controlling a redundant steering system. The apparatus includes: a first steering position controller configured to control a first MDPS module based on a first command steering angle from an autonomous driving system and a current steering angle; a second steering position controller configured to control a second MDPS module based on a second command steering angle from the autonomous driving system and the current steering angle; an internal communication interface configured to enable a communication between the first steering position controller and the second steering position controller; and a processor configured to calculate final output information including the current steering angle based on first information output from the first MDPS module and second information output from the second MDPS module, and to apply the final output information to the first steering position controller and the second steering position controller.

13 Claims, 2 Drawing Sheets

APPARATUS AND METHOD FOR CONTROLLING REDUNDANT STEERING SYSTEM

CROSS-REFERENCE TO RELATED APPLICATION

This application claims priority from and the benefit of Korean Patent Application No. 10-2022-0144538, filed on Nov. 2, 2022, which is hereby incorporated by reference for all purposes as if set forth herein.

BACKGROUND

Field

Exemplary embodiments of the present disclosure relate to an apparatus and a method for controlling a redundant steering system, and more particularly, to an apparatus and a method for controlling a redundant steering system that are capable of stably controlling a motor driven power steering (MDPS) system, in case that the MDPS system is dualized for autonomous driving, even when the dualized MDPS system has an offset or a difference of respective signals.

Discussion of the Background

In general, an electronic power steering system (e.g., MDPS system) is applied to a vehicle to reduce a steering force on a steering wheel to ensure stability in a steering state.

Recently, there has been research on a control device of the electronic power steering system equipped with a redundant system (i.e., fully redundant system) to prevent control gaps in the vehicle such as an autonomous vehicle where there is no driver intervention and to ensure the driver's safety by continuously maintaining the steering force even in the event of failure.

However, when the redundant system (i.e., fully redundant system) is introduced to the electronic power steering system (e.g., MDPS system) for autonomous driving, since one electronic power steering system is controlled by two steering position controllers (first and second steering position controllers), offset (deviation) of a position control signal accumulates, so there is a problem in that control performance decreases and position control is not performed properly.

In addition, due to a difference in signals from the two steering position controllers, outputs that control one driving shaft control the driving shaft in different directions (for example, the combined +3A and −3A is 0A, and a motor will not be rotated in this case), and when this phenomenon becomes severe, the control outputs of each other will be saturated, and eventually there is a problem in that normal control cannot be performed.

The background technology of the present disclosure is disclosed in Korean Patent Application Publication No. 10-2017-0136765 (published on Dec. 12, 2017, entitled Steering Control Device and Steering Control Method and Steering State Determination Device for the same).

SUMMARY

Various embodiments are directed to solving the above-described problems, and an object of the present disclosure is to provide an apparatus and a method for controlling a redundant steering system that are capable of stably controlling a motor driven power steering (MDPS) system, in case that the MDPS system is dualized for autonomous driving, even when the dualized MDPS system has an offset or a difference of respective signals.

In an embodiment, an apparatus for controlling a redundant steering system according to one aspect of the present disclosure, includes: a first steering position controller configured to control a first motor driven power steering (MDPS) module based on a first command steering angle from an autonomous driving system and a current steering angle; a second steering position controller configured to control a second MDPS module based on a second command steering angle from the autonomous driving system and the current steering angle; an internal communication interface configured to enable a communication between the first steering position controller and the second steering position controller; and a processor configured to calculate final output information including the current steering angle based on first information output from the first MDPS module and second information output from the second MDPS module, and to apply the final output information to the first steering position controller and the second steering position controller, in which the first steering position controller and the second steering position controller each transmit and receive the first command steering angle and the second command steering angle to and from each other through the internal communication interface, calculate a third command steering angle based on the first command steering angle and the second command steering angle, and control the corresponding MDPS module based on the third command steering angle.

In an embodiment, the first steering position controller may include: a first position controller configured to output a first command speed by calculating the third command steering angle based on the first command steering angle and the second command steering angle, and performing a position control based on the third command steering angle and the current steering angle; a first speed controller configured to output a first command current by performing a speed control based on the first command speed from the first position controller and a current steering angle speed; and a first current controller configured to output a first final command current by performing a current control based on the first command current from the first speed controller and a sensor current.

In an embodiment, the first position controller may output the first command speed by applying a low pass filter to the second command steering angle to perform low pass filtering, averaging the first command steering angle and the low pass filtered second command steering angle to calculate the third command steering angle, and compensating for an error between the third command steering angle and the current steering angle.

In an embodiment, the first speed controller may output the first command current by performing a proportional-integral (PI) control, transmitting a first integral control output value to a second speed controller of the second steering position controller when performing the integral control, receiving a second integral control output value from the second speed controller, calculating the third integral control output value based on the first integral control output value and the second integral control output value, and performing a speed control based on the third integral control output value.

In an embodiment, the first speed controller may output a third integral control output value by applying a low pass filter to the second integral control output value to perform a low pass filtering, and averaging the first integral control output value and the low pass filtered second integral control output value.

In an embodiment, the processor may monitor failure of the internal communication interface, and upon detecting the failure of the internal communication interface, change an integral control output of the first speed controller to ‘0’ and control the first speed controller to perform only a proportional control operation.

In an embodiment, the processor may monitor the failure of the internal communication interface based on a CRC or alive count value of the internal communication for a predetermined period of time.

In an embodiment, the first speed controller may reduce the integral control output in a ramp down manner for the predetermined period of time when changing the integral control output to ‘0’.

In an embodiment, the second steering position controller may include: a second position controller configured to output a second command speed by calculating the third command steering angle based on the second command steering angle and the first command steering angle, and performing a position control based on the third command steering angle and the current steering angle; a second speed controller configured to output a second command current by performing a speed control based on the second command speed from the second position controller and a current steering angle speed; and a second current controller configured to output a second final command current by performing a current control based on the second command current from the second speed controller and a sensor current.

In an embodiment, the second position controller may output the second command speed by applying a low pass filter to the first command steering angle to perform low pass filtering, averaging the second command steering angle and the low pass filtered first command steering angle to calculate the third command steering angle, and compensating for an error between the third command steering angle and the current steering angle.

In an embodiment, the second speed controller may output the second command current by performing a proportional-integral (PI) control, transmitting a second integral control output value to a first speed controller of the first steering position controller when performing the integral control, receiving a first integral control output value from the first speed controller, calculating the third integral control output value based on the first integral control output value and the second integral control output value, and performing a speed control based on the third integral control output value.

In an embodiment, the second speed controller may output a third integral control output value by applying a low pass filter to the first integral control output value to perform a low pass filtering, and averaging the second integral control output value and the low pass filtered first integral control output value.

In an embodiment, the processor may monitor failure of the internal communication interface, and upon detecting the failure of the internal communication interface, change an integral control output of the second speed controller to ‘0’ and control the second speed controller to perform only a proportional control operation.

In an embodiment, the second speed controller may reduce the integral control output in a ramp down manner for the predetermined period of time when changing the integral control output to ‘0’.

In an embodiment, the processor may calculate final output information by adding a half of the first information and a half of the second information, and the final output information may include at least one of the current steering angle, a current steering angle speed, and a sensor current.

In an embodiment, a method of controlling a redundant steering system according to another aspect of the present disclosure including a first position steering controller and a second position steering controller, the method includes: controlling, by each of the first position steering controller and the second position steering controller, a first MDPS module and a second MDPS module based on a command steering angle and a current steering angle; and calculating, by the processor, final output information including the current steering angle based on first information output from the first MDPS module and second information output from the second MDPS module, and applying the final output information to a first steering position controller and a second steering position controller.

In an embodiment, the controlling of the first MDPS module and the second MDPS module may include: outputting, by a first position controller of the first steering position controller, a first command speed by calculating a third command steering angle based on a first command steering angle and a second command steering angle, and performing a position control based on the third command steering angle and the current steering angle; outputting, by a speed controller of the first steering position controller, a first command current by performing a speed control based on the first command speed from the first position controller and a current steering angle speed; and outputting, by a first current controller of the first steering position controller, a first final command current by performing a current control based on the first command current from the first speed controller and a sensor current.

In an embodiment, in the outputting of the first command speed, the first position controller may output the first command speed by applying a low pass filter to the second command steering angle to perform low pass filtering, averaging the first command steering angle and the low pass filtered second command steering angle to calculate the third command steering angle, and compensating for an error between the third command steering angle and the current steering angle.

In an embodiment, in the outputting of the first command current, the first speed controller may output the first command current by performing the proportional-integral (PI) control, transmitting the first integral control output value to the second speed controller at the time of the integral control, receiving the second integral control output value from the second speed controller, applying the low pass filter to the second integral control output value to perform the low pass filtering, averaging the first integral control output value and the low pass filtered second integral control output value to calculate a third integral control output value, and performing the speed control based on the third integral control output value.

In an embodiment, the controlling of the first MDPS module and the second MDPS module may include: outputting, by a second position controller of the second steering position controller, a second command speed by calculating a third command steering angle based on a first command steering angle and a second command steering angle, and performing a position control based on the third command steering angle and the current steering angle; outputting, by a second speed controller of the second steering position controller, a second command current by performing a speed control based on the second command speed from the second position controller and a current steering angle speed; and outputting, by a second current controller of the second steering position controller, a second final command current by performing a current control based on the second command current from the second speed controller and a sensor current.

In an embodiment, in the outputting of the second command speed, the second position controller may output the second command speed by applying a low pass filter to the first command steering angle to perform low pass filtering, averaging the second command steering angle and the low pass filtered second command steering angle to calculate the third command steering angle, and compensating for an error between the third command steering angle and the current steering angle.

In an embodiment, in the outputting of the second command current, the second speed controller may output the second command current by performing the proportional-integral (PI) control, transmitting the second integral control output value to the first speed controller of the first steering position controller at the time of the integral control, receiving the first integral control output value from the first speed controller, applying the low pass filter to the first integral control output value to perform the low pass filtering, averaging the second integral control output value and the low pass filtered first integral control output value to calculate a third integral control output value, and performing the speed control based on the third integral control output value.

In an embodiment, the method may further include: monitoring, by the processor, failure of an internal communication interface, changing integral control outputs of a first speed controller and a second speed controller to '0' upon detecting the failure of the internal communication interface; and controlling the first and second speed controllers to perform only a proportional control operation.

In an embodiment, in the controlling of performing only the proportional control operation, the processor may monitor the failure of the internal communication interface based on a CRC or alive count value of the internal communication for a predetermined period of time.

In an embodiment, in the applying of the final output information, the processor may calculate final output information by adding a half of the first information and a half of the second information, in which the final output information may include at least one of a current steering angle speed, and a sensor current.

The apparatus and method for controlling the redundant steering system according to one aspect of the present disclosure, are capable of stably controlling a motor driven power steering (MDPS) system, in case that the MDPS system is dualized for autonomous driving, even when the dualized MDPS system has an offset or a difference of respective signals.

In an apparatus for controlling a redundant steering system and method according to another aspect of the present disclosure, the first steering position controller and the second steering position controller each transmit and receive the command steering angle and the integral control output value of the other command position controller to and from each other, and average the output values, thereby solving the problem in which the first command steering angle and the second command steering angle may not match or have an offset, and by applying the low pass filter to the command steering angle and the integral control output values received from the other steering position controller, it is possible to solve problems caused by noise during the internal communication or suddenly lost signal.

Meanwhile, the effects of the present disclosure are not limited to the above-mentioned effects, and various effects may be included within a range obvious to those skilled in the art from the following description.

DETAILED DESCRIPTION OF THE ILLUSTRATED EMBODIMENTS

Figure 1:
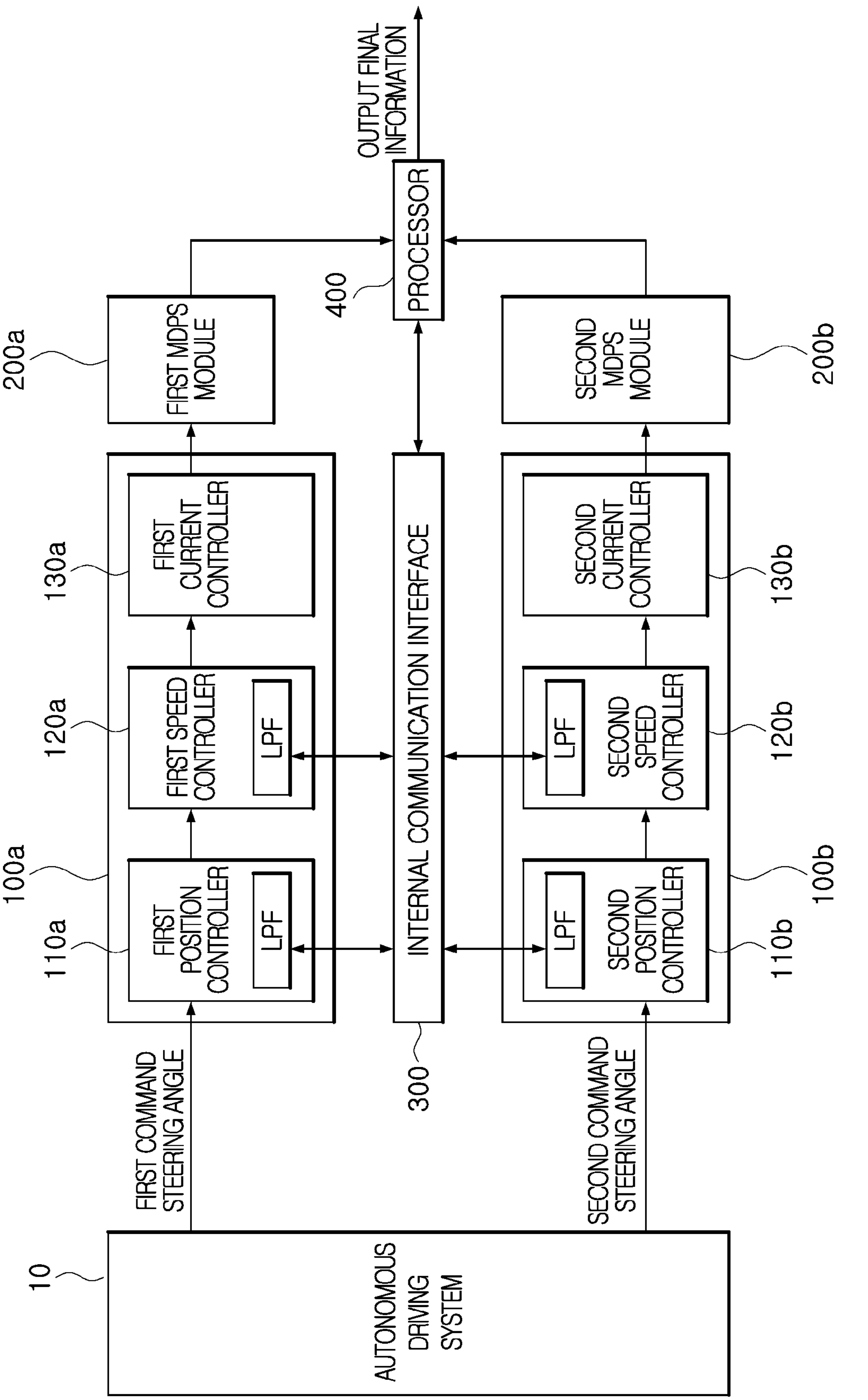
FIG. 1 is a view illustrating an apparatus for controlling a redundant steering system, according to an embodiment of the present disclosure.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being “linked,” “coupled,” or “connected” to another component, it is understood that not only a direct connection relationship but also an indirect connection relationship through an intermediate component may also be included. In addition, when a component is referred to as “comprising” or “having” another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

Hereinafter, an apparatus and a method for controlling a redundant steering system will be described below with reference to the accompanying drawings through various exemplary embodiments.

Here, thicknesses of lines illustrated in the drawings, sizes of constituent elements, or the like may be exaggerated for clarity and convenience of description. In addition, the terms used below are defined in consideration of the functions thereof in the present disclosure and may vary depending on the intention of a user or an operator or a usual practice. Therefore, such terms should be defined based on the entire contents of the present specification.

For example, the configurations described in the present specification may be implemented as methods or processes, devices, software programs, data stream, or signals. Even though only the implementation of the single form is described (e.g., only the method is described), the described features may also be implemented in other forms (e.g., devices or programs). The device may be implemented as appropriate hardware, software, firmware, and the like. For example, the method may be implemented by devices such as processors generally referring to processing devices including computers, microprocessors, integrated circuits, programmable logic devices, or the like. The processors also include communication devices such as computers, cellular phones, portable/personal information terminals (personal digital assistants (PDA)), and other devices that facilitate information communication with final users.

FIG. 1 is a view illustrating an apparatus for controlling a redundant steering system, according to an embodiment of the present disclosure.

With reference to FIG. 1, an apparatus for controlling a redundant steering system according to an embodiment of the present disclosure includes sensors 10, an autonomous driving system 20, a first steering position controller 100*a*, a second steering position controller 100*b*, a first MDPS module 200*a*, a second MDPS module 200*b*, an internal communication interface 300, and a processor 400.

The sensors 10 detect information needed for an autonomous driving and a steering control. The sensors 10 may include a sensor that detects surrounding environment information necessary for an operation of the autonomous driving system 20, a speed sensor that detects a speed of a vehicle, a steering angle sensor that detects a steering angle of a steering wheel, a motor angle sensor that measures a motor angle in response to a motor driving of the MDPS modules 200*a* and 200*b*, and the like.

The autonomous driving system 20 outputs a command steering angle for controlling the autonomous driving of the vehicle based on the surrounding environment information input from the sensor 10 in an autonomous driving mode. In this case, the autonomous driving system 20 may input a first command steering angle to the first steering position controller 100*a* and input a second command steering angle to the second steering position controller 100*b*. Here, the first command steering angle and the second command steering angle may be the same steering angle or different steering angles.

Since the autonomous driving system 20 performing the autonomous driving control based on the surrounding environment information may be easily carried out by those skilled in the art, a detailed description is omitted herein.

The first steering position controller 100*a* and the second steering position controller 100*b* constitute a dualized structure to ensure a redundant function of an autonomous driving vehicle. Accordingly, when one command position controller 100*a* and 100*b* of the first command position controller 100*a* and the second command position controller 100*b* fails, the other command position controller 100*a* and 100*b* continues to perform the steering control so that the autonomous driving or a driver steering assistance may continue to be performed.

The first steering position controller 100*a* and the second steering position controller 100*b* perform the steering control based on the first command steering angle and the second command steering angle that are input from the autonomous driving system 20. That is, the first steering position controller 100*a* may control the first MDPS module 200*a* based on the first command steering angle from the autonomous driving system 20 and a current steering angle from the processor 400, and the second steering position controller 100*b* may control the second MDPS module 200*b* based on the second command steering angle from the autonomous driving system 20 and the current steering angle from the processor 400. Here, the current steering angle may be a steering angle calculated and received as feedback from the processor 400.

The first steering position controller 100*a* may control the first MDPS module 200*a* in the autonomous driving mode by outputting a first autonomous driving command (a first final command current) based on the first command steering angle and the current steering angle. The second steering position controller 100*b* may control the second MDPS module 200*b* in the autonomous driving mode by outputting a second autonomous driving command (a second final command current) based on the second command steering angle and the current steering angle. In this case, the first steering position controller 100*a* and the second steering position controller 100*b* may be controlled independently of each other. Therefore, even if one steering position controller 100*a* or 100*b* fails, the other steering position controller 100*a* or 100*b* continues to operate, so that a steering force may be maintained.

The first steering position controller 100*a* and the second steering position controller 100*b* may be connected through the internal communication interface 300. Here, the internal communication interface 300 may include CAN communication or the like.

An output of the first steering position controller 100*a* is the first final command current, and the first final command current is applied to a first motor (not illustrated) of the first MDPS module 200*a*, and the desired command steering angle is followed by the current steering angle while the first motor is driving.

The first steering position controller 100*a* includes a first position controller 110*a*, a first speed controller 120*a*, and a first current controller 130*a*.

The first position controller 110*a* may output a first command speed by performing the position control based on the first command steering angle from the autonomous driving system 20 and the current steering angle that is received as feedback from the processor 400.

When the autonomous driving system 20 applies a command steering angle to the steering position controllers 100*a* and 100*b*, the steering position controllers 100*a* and 100*b* may perform the position control based on the applied command steering angle. However, since the command position controllers 100*a* and 100*b* constitute a redundant structure, which is a dual structure, the first command steering angle of the first command position controller 100*a* and the second command steering angle of the second steering controller 100*b* may not perfectly match each other or may have an offset. In this case, the first steering position controller 100*a* and the second steering position controller 100*b* control the first MDPS module 200*a* and the second MDPS module 200*b* in conflicting directions, and thereby the position control is not able to be accomplished normally. To solve this problem, the first position controller 110*a* and the second position controller 110*b* may exchange the first command steering angle and the second command steering angle with each other through the internal communication interface 300, average the first command steering angle and the second command steering angle, and perform the position control based on a third command steering angle that is the same averaged command steering angle.

However, the above-described method is limited to a case where an internal communication between the first position controller 110*a* and the second position controller 110*b* is normal.

When there is a problem with the internal communication between the first position controller 110*a* and the second position controller 110*b*, the communication may be lost or a communication value may not be normal due to a noise generated, thereby resulting in a phenomenon that the control of the first MDPS module 200*a* and the second MDPS module 200*b* is not properly performed. Usually, there are error detection methods for CAN signals such as Alive count or CRC to detect failures in internal communication. However, these methods use a fail-operation method that does not use the internal communication when the above-mentioned phenomenon occurs for a certain period of time, which may be several ms. However, since an actual control speed is almost 1 to 2 ms, any noise or sudden loss of signal during this time may cause significant problems.

To prevent this, the first position controller 110*a* and the second position controller 110*b*, which perform the internal communication, may apply a LPF to control an instantaneous abnormal value.

Therefore, the first position controller 110*a* may output the first command speed by transmitting the first command steering angle from the autonomous driving system 20 to the second position controller 110*b* of the second steering position controller 100*b* through the internal communication interface 300, receiving the second command steering angle from the second position controller 110*b* of the second steering position controller 100*b* through the internal communication interface 300, applying the low pass filter (LPF) to the second command steering angle to perform low pass filtering, averaging the first command steering angle and the low pass filtered second command steering angle to calculate a third command steering angle, and compensating for an error between the third command steering angle and the current steering angle.

Accordingly, the first position controller 110*a* averages the first command steering angle and the second command steering angle, thereby solving the problem that the first command steering angle and the second command steering angle may not match or may have an offset, and by applying the low pass filter, the problem caused by the phenomenon that noise occurs during the internal communication or the signal is suddenly lost may be solved.

The first position controller 110*a* may be configured as a PD controller or a lead compensator.

The first speed controller 120*a* may output the first command current by performing a speed control based on the first command speed and the current steering angle speed from the first position controller 110*a*. That is, the first speed controller 120*a* may output the first command current by compensating for a speed error, which is a difference between the first command speed output from the first position controller 110*a* and the current steering angle speed received as feedback from the processor 400. In this case, the first speed controller 120*a* may be configured as a PI controller or a lag compensator.

When the first speed controller 120*a* is implemented as the PI controller, the first speed controller 120*a* may perform a proportional control and an integral control. The proportional control is proportionally controlling an amount of speed error, and the integral control is integrally controlling an amount of speed error.

In I-control part, which is the integral control, control outputs of the first steering position controller 100*a* and the second steering position controller 100*b* may conflict with each other when an amount of output offset from each other is continuously accumulated. When the amount of output offset from each other is continuously accumulated in the I-control part, errors are continuously accumulated in a speed value that is fed back due to offset or sensitivity characteristic, and therefore, a control strategy for this matter is necessary. The first speed controller 120*a* and the second speed controller 120*b* may each transmit and receive an integral control output value to and from each other through the internal communication interface 300 in order to compensate for the accumulated amount of offset, and may perform the speed control based on a first integral control output value and a second integral control output value that are transmitted and received.

However, during the internal communication through the internal communication interface 300, a phenomenon may occur in which noise is generated or the signal is suddenly lost, resulting in a phenomenon in which a control of the first MDPS module 200*a* and the second MDPS module 200*b* is not properly performed.

To prevent this, the first speed controller 120*a* and the second speed controller 120*b*, which perform the internal communication, may apply the LPF to control an instantaneous abnormal value.

Therefore, at the time of the integral control, the first speed controller 120*a* may output the first command current by transmitting the first integral control output value to the second speed controller 120*b* of the second steering position controller 100*b* through the internal communication interface 300, receiving the second integral control output value from the second speed controller 120*b* of the second steering position controller 100*b* through the internal communication interface 300, applying the low pass filter to the second integral control output value to perform low pass filtering, averaging the first integral control output value and the low pass filtered second integral control output value to calculate a third integral control output value, and performing the speed control based on the third integral control output value.

Accordingly, the first speed controller 120*a* averages the first integral control output value and the second integral control output value, thereby solving the problem that the output offset is accumulated in the I-control part, and by applying the low pass filter, the problem that is caused by the phenomenon that noise is generated during the internal communication or the signal is suddenly lost may be solved.

Meanwhile, when the internal communication interface 300 itself experiences a problem, the LPF is no longer meaningful. That is, in case that there is a situation where the internal communication interface 300 fails and the controllers is unable to exchange the respective values with each other, the biggest problem factor is the integral control parts of the first speed controller 120*a* and the second speed controller 120*b*. When there is a situation where the internal communication interface 300 fails and the controllers is unable to exchange the respective values with each other, the control outputs are driven in opposite directions as errors are rapidly accumulated, causing the outputs to be saturated in opposite directions and reach uncontrollable levels.

Accordingly, when the internal communication interface 300 fails, the first speed controller 120*a* may change the integral control output to "0" and perform only the proportional control operation. In this case, when the first speed controller 120*a* suddenly changes the integral control output to "0", the control output value may change significantly, so the first speed controller 120*a* may slowly decrease the integral control output in a ramp down manner over a certain period of time.

The first current controller 130*a* may output the first final command current by performing a current control based on the first command current from the first speed controller 120*a* and a sensor current.

That is, the first current controller 130*a* may output the first final command current by compensating for a current error between the first command current output from the first speed controller 120*a* and the sensor current. In this case, the first current controller 130*a* may be a PI controller, and the sensor current may be a current calculated by the processor 400.

When the first current controller 130*a* receives the first command current from the first speed controller 120*a* and the sensor current from the processor 400, the first current controller 130*a* may output the first final command current by compensating for an error corresponding to the difference between the first command current and the sensor current, and may apply the first final command current to the first MDPS module 200*a*.

The first MDPS module 200*a* may apply the first final command current to the first motor, thereby enabling the current steering angle to follow a desired command steering angle while the first motor is driving.

An output of the second steering position controller 100*b* is the second final command current, and the second final command current is applied to a second motor (not illustrated) of the second MDPS module 200*b*, and the desired command steering angle is followed by the current steering angle while the second motor is driving.

The second steering position controller 100*b* includes the second position controller 110*a*, the second speed controller 120*b*, and a second current controller 130*b*.

The second position controller 110*b* may output the second command speed by transmitting the second command steering angle from the autonomous driving system 20 to the first position controller 110*a* of the first steering position controller 100*a* through the internal communication interface 300, receiving the first command steering angle from the first position controller 110*a* of the first steering position controller 100*a* through the internal communication interface 300, applying the low pass filter (LPF) to the first command steering angle to perform low pass filtering, averaging the second command steering angle and the low pass filtered first command steering angle to calculate the third command steering angle, and compensating for an error between the third command steering angle and the current steering angle.

Accordingly, the second position controller 110*b* averages the first command steering angle and the second command steering angle, thereby solving the problem that the first command steering angle and the second command steering angle may not match or may have an offset, and by applying the low pass filter, the problem caused by the phenomenon that noise occurs during the internal communication or the signal is suddenly lost may be solved.

The second position controller 110*b* may be configured as a PD controller or a lead compensator.

The second speed controller 120*b* may output the second command current by performing the speed control based on the second command speed and the current steering angle speed from the second position controller 110*b*. That is, the second speed controller 120*b* may output the second command current by compensating for a speed error, which is a difference between the second command speed from the second position controller 110*b* and the current steering angle speed. In this case, the second speed controller 120*b* may be configured as a PI controller or a lag compensator.

When the second speed controller 120*b* is implemented as the PI controller, the second speed controller 120*b* may perform a proportional control and an integral control.

At the time of the integral control, the second speed controller 120*a* may output the second command current by transmitting the second integral control output value to the first speed controller 120*a* of the first steering position controller 100*a* through the internal communication interface 300, receiving the first integral control output value from the first speed controller 120*a* of the first steering position controller 100*a* through the internal communication interface 300, applying the low pass filter to the first integral control output value to perform low pass filtering, averaging the second integral control output value and the low pass filtered first integral control output value to calculate the third integral control output value, and performing the speed control based on the third integral control output value.

Accordingly, the second speed controller 120*b* averages the first integral control output value and the second integral control output value, thereby solving the problem that the output offset is accumulated in the I-control part, and by applying the low pass filter, the problem that is caused by the phenomenon that noise is generated during the internal communication or the signal is suddenly lost may be solved.

When the internal communication interface 300 fails, the second speed controller 120*b* may change the integral control output to "0" and perform only the proportional control operation. In this case, when the second speed controller 120*b* suddenly changes the integral control output to "0", the control output value may change significantly, so the second speed controller 120*b* may slowly decrease the integral control output in a ramp down manner over a certain period of time.

The second current controller 130*b* may output the second final command current by performing the current control based on the second command current from the second speed controller 120*b* and the sensor current.

That is, the second current controller 130*b* may output the second final command current by compensating for a current error between the second command current output from the second speed controller 120*b* and the sensor current. In this case, the second current controller 130*b* may be a PI controller, and the sensor current may be a current calculated by the processor 400.

When the second current controller 130*b* receives the second command current from the second speed controller 120*b* and the sensor current from the processor 400, the second current controller 130*b* may output the second final command current by compensating for an error corresponding to the difference between the second command current and the sensor current, and may apply the second final command current to the second MDPS module 200*b*.

The second MDPS module 200*b* may apply the second final command current to the second motor, thereby enabling the current steering angle to follow a desired command steering angle while the second motor is driving.

The processor 400 may monitor failure of the internal communication interface 300 and, when detecting the failure of the internal communication interface 300, change the integral control outputs of the first speed controller 120*a* and the second speed controller 120*b* to '0' and control the first speed controller 120*a* and the second speed controller 120*b* to perform only the proportional control operation. In this case, the processor 400 may monitor the failure of the internal communication interface 300 based on a CRC or alive count value of the internal communication for a predetermined period of time. That is, when the CRC or the alive count value of the internal communication is not normal for the predetermined period of time according to a fail-operation algorithm, the processor 400 may determine that the internal communication interface 300 has failed, block the use of the values of the internal communication, and configure the integral control outputs of the first speed controller 120*a* and the second speed controller 120*b* to be "0" to allow the first speed controller 120*a* and the second speed controller 120*b* to operate only as P controllers. Here, the CRC refers to a specific code for detecting signal errors in the CAN communication, and the alive count sequentially increases the count value to monitor whether the CAN signal is changing normally, and when the value does not increase properly and periodically, it may be determined that the signal is lost or failure occurs.

In addition, the processor 400 may calculate final output information including the current steering angle based on first information that is output from the first MDPS module 200*a* and second information that is output from the second MDPS module 200*b*, and may apply the final output information to the first steering position controller 100*a* and the second steering position controller 100*b*. Here, the first information may include a first current steering angle, a first current steering angle speed, a first sensor current, and the like, the second information may include a second current steering angle, a second current steering angle speed, a second sensor current, and the like, and the final output information may include a current steering angle, a current steering angle speed, a sensor current, and the like.

That is, the processor 400 may calculate the final output information by adding a half of the first information output from the first MDPS module 200*a* and a half of the second information output from the second MDPS module 200*b*. That is, the processor 400 may result in a 100% output by adding the half of the first information and the half of the second information.

For example, the processor 400 may calculate the current steering angle by adding a half of the first current steering angle output from the first MDPS module 200*a* and a half of the second current steering angle output from the second MDPS module 200*b*, and the calculated current steering angle may be set as the final output steering angle.

When one system fails completely, the processor 400 may not process the first and second information in halves, but may output a normal output from one system as the final output information. This is because the output from one system doesn't need to be split in half, and be output as it is.

Meanwhile, the present embodiment describes the first steering position controller 100*a* and the second steering position controller 100*b* as separate configurations within the processor 400 for ease of understanding of the embodiment, but it may be implemented in some embodiments that the first steering position controller 100*a* and the second steering position controller 100*b* are configured as sub-configurations of the processor 400 such that the processor 400 integrally performs each sub-configuration.

The apparatus for controlling the redundant steering system configured as described above may enable stable control to be achieved even when the command steering angles of the first steering position controller 100*a* and the second steering position controller 100*b*, which are the fully redundant structure, do not match each other. In addition, even if the internal communication between the first steering position controller 100*a* and the second steering position controller 100*b* is lost, the control may continue to be performed without problems.

Figure 2:
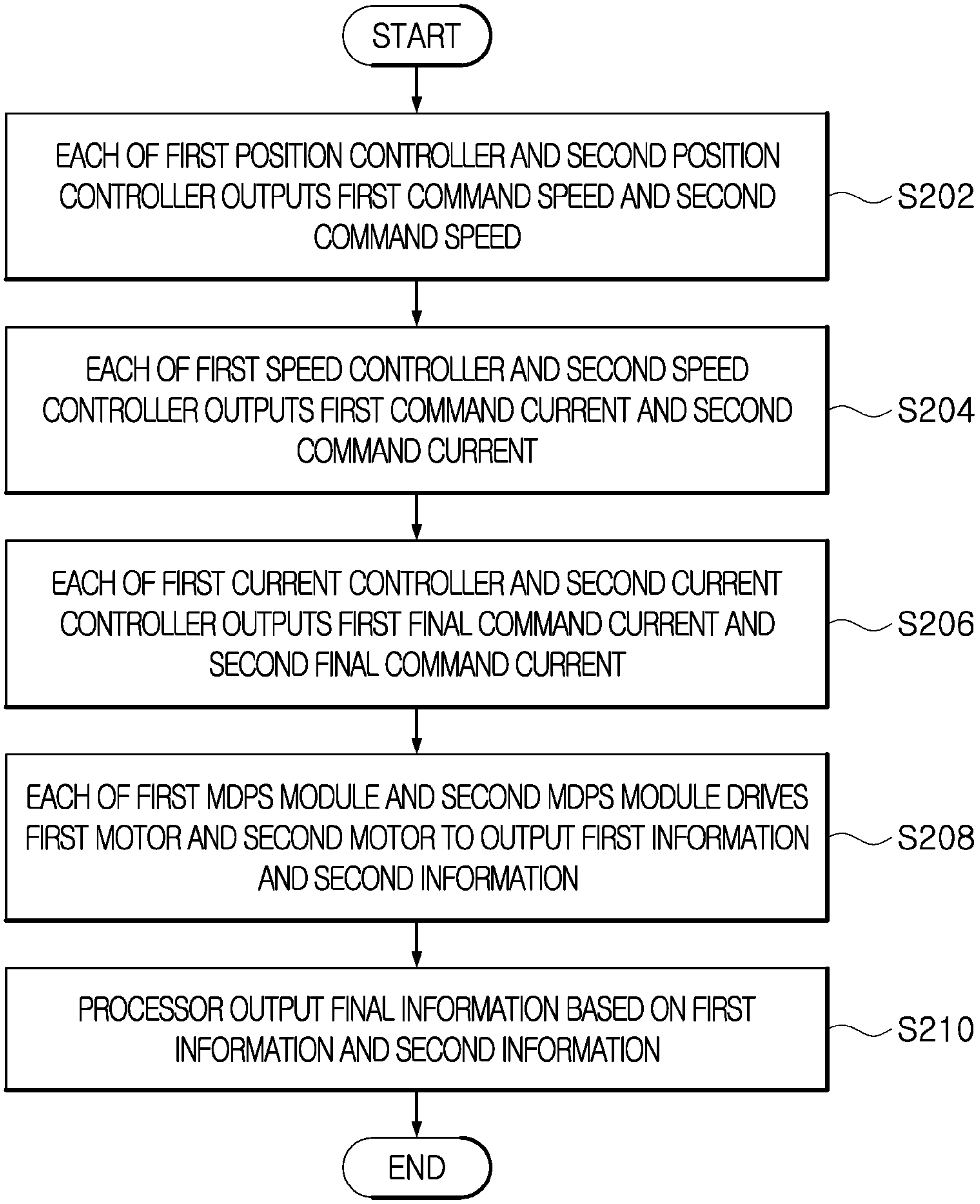
FIG. 2 is a view illustrating a method of controlling the redundant steering system, according to an embodiment of the present disclosure.

FIG. 2 is a view illustrating a method of controlling the redundant steering system, according to an embodiment of the present disclosure.

With reference to FIG. 2, the first position controller 110*a* and the second position controller 110*b* each calculate the first command speed and the second command speed based on the command steering angle and the current steering angle (S202). That is, the first position controller 110*a* may output the first command speed by transmitting the first command steering angle from the autonomous driving system 20 to the second position controller 110*b* through the internal communication interface 300, receiving the second command steering angle from the second position controller 110*b* through the internal communication interface 300, applying the low pass filter to the second command steering angle to perform low pass filtering, averaging the first command steering angle and the low pass filtered second command steering angle to calculate the third command steering angle, and compensating for an error between the third command steering angle and the current steering angle. The second position controller 110*a* may output the second command speed by transmitting the second command steering angle from the autonomous driving system 20 to the first position controller 110*a* through the internal communication interface 300, receiving the first command steering angle from the first position controller 110*a* through the internal communication interface 300, applying the low pass filter to the first command steering angle to perform low pass filtering, averaging the second command steering angle and the low pass filtered first command steering angle to calculate the third command steering angle, and compensating for an error between the third command steering angle and the current steering angle.

When step S202 is performed, the first speed controller 120*a* and the second speed controller 120*b* output the first command current and the second command current by each performing the speed control based on the first command speed and the second command speed from the first position controller 110*a* and the second position controller 110*b* and the current steering angle speed (S204). That is, the first speed controller 120*a* may output the first command current by performing the proportional-integral (PI) control, transmitting the first integral control output value to the second speed controller 120*b* at the time of the integral control, receiving the second integral control output value from the second speed controller 120*b*, applying the low pass filter to the second integral control output value to perform the low pass filtering, averaging the first integral control output value and the low pass filtered second integral control output value to calculate a third integral control output value, and performing the speed control based on the third integral control output value. The second speed controller 120*b* may output the second command current by performing the proportional-integral (PI) control, transmitting the second integral control output value to the first speed controller 120*a* at the time of the integral control, receiving the first integral control output value from the first speed controller 120*a*, applying the low pass filter to the first integral control output value to perform the low pass filtering, averaging the second integral control output value and the low pass filtered first integral control output value to calculate the third integral control output value, and performing the speed control based on the third integral control output value. In this case, when the internal communication interface 300 fails, the first speed controller 120*a* and the second speed controller 120*b* may change the integral control output to "0" and perform only the proportional control operation.

When step S204 is performed, the first current controller 130*a* and the second current controller 130*b* each output the first final command current and the second final command current based on the first command current and the second command current and the sensor current (S206). That is, when the first current controller 130*a* receives the first command current from the first speed controller 120*a* and the sensor current from the processor 400, the first current controller 130*a* may output the first final command current by compensating for an error corresponding to the difference between the first command current and the sensor current, and may apply the first final command current to the first MDPS module 200*a*. In addition, when the second current controller 130*b* receives the second command current from the second speed controller 120*b* and the sensor current from the processor 400, the second current controller 130*b* may output the second final command current by compensating for an error corresponding to the difference between the second command current and the sensor current, and may apply the second final command current to the second MDPS module 200*b*.

When step S206 is performed, the first MDPS module 200*a* and the second MDPS module 200*b* each drive the first motor and the second motor based on the first final command current and the second final command current to output the first information and the second information (S208). That is, the first MDPS module 200*a* may output the first information by applying the first final command current to the first motor to drive the first motor. The second MDPS module 200*b* may output the second information by applying the second final command current to the second motor to drive the second motor.

When step S208 is performed, the processor 400 calculates the final output information (S210) based on the first information output from the first MDPS module 200*a* and the second information output from the second MDPS module 200*b*. In this case, the processor 400 may calculate the final output information by adding a half of the first information output from the first MDPS module 200*a* and a half of the second information output from the second MDPS module 200*b*.

As described above, the apparatus and method for controlling the redundant steering system according to one aspect of the present disclosure, are capable of stably controlling a motor driven power steering (MDPS) system, in case that the MDPS system is dualized for autonomous driving, even when the dualized MDPS system has an offset or a difference of respective signals.

In an apparatus for controlling a redundant steering system and method according to another aspect of the present disclosure, the first steering position controller and the second steering position controller each transmit and receive the command steering angle and the integral control output value of the other steering position controller to and from each other, and average the output values, thereby solving the problem in which the first command steering angle and the second command steering angle may not match or have an offset, and by applying the low pass filter to the command steering angle and the integral control output values received from the other steering position controller, it is possible to solve problems caused by noise during the internal communication or suddenly lost signal.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for controlling a redundant steering system comprising:

a first steering position controller configured to control a first motor driven power steering (MDPS) module based on a first command steering angle from an autonomous driving system and a current steering angle;

a second steering position controller configured to control a second MDPS module based on a second command steering angle from the autonomous driving system and the current steering angle;

an internal communication interface configured to enable a communication between the first steering position controller and the second steering position controller; and a processor configured to calculate final output information including the current steering angle based on first information output from the first MDPS module and second information output from the second MDPS module, and to apply the final output information to the first steering position controller and the second steering position controller, wherein the first steering position controller and the second steering position controller each:

transmit and receive the first command steering angle and the second command steering angle to and from each other through the internal communication interface;

calculate a third command steering angle based on the first command steering angle and the second command steering angle; and control the corresponding MDPS module based on the third command steering angle, and wherein the first steering position controller comprises:

a first steering position controller comprising a first position controller configured to output a first command speed by calculating the third command steering angle based on the first command steering angle and the second command steering angle, and performing a position control based on the third command steering angle and the current steering angle;

a first speed controller configured to output a first command current by performing a speed control based on the first command speed from the first position controller and a current steering angle speed; and a first current controller configured to output a first final command current by performing a current control based on the first command current from the first speed controller and a sensor current.

2. The apparatus of claim 1, wherein the first position controller outputs the first command speed by applying a low pass filter to the second command steering angle to perform low pass filtering, averaging the first command steering angle and the low pass filtered second command steering angle to calculate the third command steering angle, and compensating for an error between the third command steering angle and the current steering angle.

3. The apparatus of claim 1, wherein the first speed controller outputs the first command current by performing a proportional-integral (PI) control, transmitting a first integral control output value to a second speed controller of the second steering position controller when performing the integral control, receiving a second integral control output value from the second speed controller, calculating a third integral control output value based on the first integral control output value and the second integral control output value, and performing a speed control based on the third integral control output value.

4. The apparatus of claim 1, wherein the processor monitors failure of the internal communication interface by monitoring the internal communication interface, and upon detecting the failure of the internal communication interface, changes an integral control output of the first speed controller to '0' and controls the first speed controller to perform only a proportional control operation.

5. The apparatus of claim 1, wherein the second steering position controller comprises:

a second position controller configured to output a second command speed by calculating the third command steering angle based on the second command steering angle and the first command steering angle, and performing a position control based on the third command steering angle and the current steering angle;

a second speed controller configured to output a second command current by performing a speed control based on the second command speed from the second position controller and a current steering angle speed; and a second current controller configured to output a second final command current by performing a current control based on the second command current from the second speed controller and a sensor current.

6. The apparatus of claim 5, wherein the second position controller outputs the second command speed by applying a low pass filter to the first command steering angle to perform low pass filtering, averaging the second command steering angle and the low pass filtered first command steering angle to calculate the third command steering angle, and compensating for an error between the third command steering angle and the current steering angle.

7. The apparatus of claim 5, wherein the second speed controller outputs the second command current by performing a proportional-integral (PI) control, transmitting a second integral control output value to a first speed controller of the first steering position controller when performing the integral control, receiving a first integral control output value from the first speed controller, calculating a third integral control output value based on the first integral control output value and the second integral control output value, and performing a speed control based on the third integral control output value.

8. The apparatus of claim 5, wherein the processor monitors failure of the internal communication interface, and upon detecting the failure of the internal communication interface, changes an integral control output of the second speed controller to '0' and controls the second speed controller to perform only a proportional control operation.

9. The apparatus of claim 1, wherein the processor calculates final output information by adding a half of the first information and a half of the second information, and wherein the final output information comprises at least one of the current steering angle, a current steering angle speed, and a sensor current.

10. A method of controlling a redundant steering system including a first position steering controller and a second position steering controller, the method comprising:

controlling, by each of the first position steering controller and the second position steering controller, a first MDPS module and a second MDPS module based on a command steering angle and a current steering angle, wherein the controlling of the first MDPS module and the second MDPS module comprises:

outputting, by a first position controller of the first steering position controller, a first command speed by calculating a third command steering angle based on a first command steering angle and a second command steering angle, and performing a position control based on the third command steering angle and the current steering angle;

outputting, by a speed controller of the first steering position controller, a first command current by performing a speed control based on the first command speed from the first position controller and a current steering angle speed; and outputting, by a first current controller of the first steering position controller, a first final command current by performing a current control based on the first command current from the first speed controller and a sensor current; and calculating, by a processor, final output information including the current steering angle based on first information output from the first MDPS module and second information output from the second MDPS module, and applying the final output information to a first steering position controller and a second steering position controller.

11. The method of claim 10, wherein the controlling of the first MDPS module and the second MDPS module comprises:

outputting, by a second position controller of the second steering position controller, a second command speed by calculating a third command steering angle based on a first command steering angle and a second command steering angle, and performing a position control based on the third command steering angle and the current steering angle;

outputting, by a second speed controller of the second steering position controller, a second command current by performing a speed control based on the second command speed from the second position controller and a current steering angle speed; and outputting, by a second current controller of the second steering position controller, a second final command current by performing a current control based on the second command current from the second speed controller and a sensor current.

12. The method of claim 10, further comprising:

monitoring, by the processor, failure of an internal communication interface, changing integral control outputs of a first speed controller and a second speed controller to '0' upon detecting the failure of the internal communication interface; and controlling the first and second speed controllers to perform only a proportional control operation.

13. The method of claim 10, wherein the processor calculates final output information by adding a half of the first information and a half of the second information in the applying of the final output information, and wherein the final output information further comprises at least one of a current steering angle speed and a sensor current.

* * * * *